2,999,828
WAX COMPOSITION AND SHEET MATERIALS
COATED THEREWITH
Robert W. Dannenbrink, Neenah, and George E. Unmuth, Menasha, Wis., assignors to American Can Company, New York, N.Y., a corporation of New Jersey
No Drawing. Filed May 5, 1959, Ser. No. 810,985
9 Claims. (Cl. 260—28.5)

This invention relates to improved wax compositions and sheet materials coated therewith, and more particularly to compositions of petroleum wax and polyethylene for use in coating sheet materials and obtaining thereby improved properties of gloss and seal strength over a wide range of temperature.

This application is a continuation-in-part of application Serial No. 646,563, filed March 18, 1957, now abandoned.

A high seal strength and good adhesion to the base sheet are among the functional properties which are important in heat-sealing compositions used for coating protective packaging materials. A high seal strength over a wide temperature range is particularly important in coated sheet materials used for packaging frozen foods which are customarily stored at or about 0° F. High coating gloss and good gloss retention on aging are desirable properties which enhance the aesthetic appeal of packaging materials. This visual appeal has proven to be an important factor in the customer's choice of particular brands of packaged commodities.

We have found that very high seal strength over a wide range of temperature, excellent adhesion to a variety of base sheets, high gloss and excellent gloss retention, and other desirable properties are obtained by coating flexible packaging materials with a composition containing both a highly branched polyethylene of relatively low molecular weight and an intermediate wax obtained from petroleum wax distillate.

The degree of branching of the carbon to carbon polymeric chain in a polyethylene molecule is closely related to the solid density of the polymer, more highly branched polyethylene having a lower density than that of the straight chain material. In most commercially available polyethylene, the polymer molecule is essentially completely normal straight chain paraffinic in nature, no more than 1% to 5% of the carbon atoms present being in the form of short chain branches attached to the main paraffinic carbon chain. Polyethylene of this straight chain type ranges in density from 0.915 to 0.960.

To be of value in the present invention, however, the polyethylene must be more highly branched in molecular configuration and consequently exhibit a lower solid density than the polyethylene described above. We have found that polyethylene of a molecular weight between about 3,000 and 12,000 having at least 7%, and preferably between 7% and 12%, of the carbon atoms of the molecule present in short chain branches (that is, methyl, ethyl, or possibly propyl or butyl groups) attached to the main linear polymeric chain and having a solid density of less than 0.91, and preferably between 0.88 and 0.91, is necessary for satisfactory use in the compositions of our invention.

The following Table I lists pertinent physical properties of various polyethylenes. Polyethylenes exhibiting particular combinations of these properties will be found suitable for use in our invention as hereinafter described in detail.

Table I

| Polyethylene | Molecular Weight | Density | Percent of Branched Carbons in Molecule |
|---|---|---|---|
| A | 3,300 | 0.905 | 7.0 |
| B | 4,000 | 0.890 | 8.7 |
| C | 7,000 | 0.895 | 7.5 |
| D | 11,500 | 0.885 | 11.6 |
| E | 2,000 | 0.920 | <1.0 |
| F | 5,000 | 0.920 | <1.0 |
| G | 7,000 | 0.900 | 5.3 |
| H | 12,000 | 0.910 | 3.2 |

Polyethylenes A, B, C and D in the above table exhibit a combination of properties satisfactory for use in the compositions of our invention, each having a molecular weight between 3,000 and about 12,000, a solid density between 0.880 and 0.910 and between 7% and 12% of the carbon atoms in the polymer molecule being present as short branches attached to the main carbon chain. Polyethylenes E, F, G and H are not satisfactory for our use, since each is deficient in at least one of the necessary physical properties which describe a polyethylene suitable for our use.

Polyethylene B, having a molecular weight of about 4,000 as measured by viscosity methods, a solid density of 0.890 and having about 8.7% of the carbon atoms of the molecule present in the form of short chain branching, has proven particularly desirable for our use. Polyethylene having these particular characteristics is available under the trade name DYDT polyethylene, a product of Carbide and Carbon Chemical Corporation.

The petroleum waxes which are of value in our compositions are of a unique intermediate class midway in molecular weight between paraffin wax and microcrystalline wax, and closely resembling neither. Paraffin wax is obtained from the overhead wax distillate fraction resulting from the fractional distillation of petroleum. Microcrystalline waxes are obtained from the non-distillable pot residue or still residue from the above fractionation. Paraffin wax is almost completely composed of normal straight chain paraffinic hydrocarbons. It is friable and brittle, exhibits large regular platelike crystals and may be purified of oil by a sweating process. Microcrystalline waxes have a higher molecular weight and higher boiling point than paraffin and are composed of mixtures of isoparaffins, naphthenes and small amounts of aromatic and straight chain paraffinic hydrocarbons. They are generally more ductile than paraffin wax and crystallize in very tiny, malformed crystals. Microcrystalline waxes are difficult to separate from petroleum oil and cannot be purified by sweating. Neither paraffin wax nor the microcrystalline waxes exhibit the unique combination of properties which are characteristic of the intermediate waxes and which are necessary for the practice of the present invention.

The waxes of the special intermediate class do not closely resemble either paraffin or microcrystalline wax in their properties. Although they are relatively friable and brittle, as is paraffin, they are non-sweatable, have a higher surface friction and smaller crystal size than paraffin, and have other properties suggestive of microcrystalline wax. Their molecular weight ranges midway between that of paraffin and microcrystalline wax. Their viscosity and refractive index are higher than those of paraffin but lower than those of microcrystalline waxes of comparable melting point. The intermediate waxes consist of mixtures of naphthenes, isoparaffins and normal paraffins, They are obtained from the high boiling wax distillate fraction of petroleum. Since they may not be refined by sweating procedures, they are purified by solvent recrystallization. Their melting points range from about 140° F. to about 170° F.

The intermediate waxes of value in the present invention may be distinguished from both paraffin and microcrystalline waxes by a consideration of the refractive index-melting point relationship and viscosity. The refractive index of paraffin wax melting at 120° F. ranges from 1.420 to 1.425 as measured at 194° F. (90° C.) and the upper and lower limits of refractive index increase by about 0.0002 unit per degree Fahrenheit increase in melting point. Consequently, paraffin wax melting at 130° F. ranges in refractive index from 1.422 to 1.427 (at 194° F.) and a 140° F. melting paraffin wax ranges in refractive index (at 194° F.) from 1.424 to 1.429. The refractive indices of the intermediate waxes are higher than the upper limits of paraffin wax of a comparable melting point. To be considered as an intermediate wax suitable for our use, a wax must have a refractive index at 194° F. of at least 1.4292 plus 0.0002 refractive index units for each degree Fahrenheit that the melting point of the wax exceeds 140° F. That is, if the melting point of the wax is 140° F., the refractive index must be greater than 1.4292. Similarly, if the melting point is 150° F., the refractive index must be greater than 1.4312 and if the melting point is 160° F., the refractive index must exceed 1.4332 and so on, in each case measured at 194° F. This refractive index-melting point relationship clearly distinguishes the waxes useful in our invention from the material termed paraffin wax.

Our waxes are distinguished from microcrystalline waxes by their viscosity relationship. The intermediate waxes useful for our purposes exhibit viscosities which never exceed 10 centistokes when measured at 210° F., whereas all microcrystalline waxes exhibit viscosities in excess of 10 centistokes at the above temperature.

These distinguishing features are clearly illustrated in the following Table II, in which the melting point as measured by ASTM standard method D-938, the viscosity at 210° F. and refractive index at 194° F. are tabulated for a group of intermediate waxes and, for comparison purposes, similar properties of a representative paraffin wax and a representative microcrystalline wax are also given. Neither paraffin wax nor microcrystalline wax may be used satisfactorily to replace the critical intermediate wax component in our compositions, since neither of these wax types possesses the desired characteristics, as exemplified by their physical properties tabulated below.

*Table II*

| Wax | M.P. in °F. | $n_D$ at 194° F. | Viscosity in Cstks. at 210° F. |
| --- | --- | --- | --- |
| Intermediate Wax No. 1 | 161.1 | 1.4342 | 7.46 |
| Intermediate Wax No. 2 | 150.3 | 1.4338 | 6.40 |
| Intermediate Wax No. 3 | 143.6 | 1.4313 | 5.13 |
| Intermediate Wax No. 4 | 152.6 | 1.4339 | 6.30 |
| Intermediate Wax No. 5 | 158.9 | 1.4354 | 7.70 |
| Intermediate Wax No. 6 | 153.0 | 1.4350 | 5.50 |
| Intermediate Wax No. 7 | 167.6 | 1.4371 | 8.10 |
| Microcrystalline Wax | 145.0 | 1.4455 | 17.50 |
| Paraffin Wax | 141.0 | 1.4281 | 4.50 |

Intermediate waxes and polyethylene having the hereinbefore described characteristics give unexpectedly desirable results when utilized in combination in wax compositions, particularly compositions which also contain up to about 50% by weight of a coating grade of microcrystalline wax melting from about 140° F. to about 170° F. Coating compositions which contain one but not the other of the critical components do not exhibit the unique combination of properties attained by the compositions of our invention.

For example, in Table III, below, are given the seal strengths of wax blends containing, in one case, both a preferred polyethylene and a satisfactory intermediate wax of our invention and in the other case, for comparison, the same polyethylene in a blend with a standard fully-refined paraffin wax. Both blends also contain a standard coating guide microcrystalline wax. The properties of polyethylene B and intermediate wax No. 1 are listed in Table I and Table II, respectively.

All of the wax compositions listed in this and the following tables were prepared by melting the components together in the percentages given by weight and then the chosen base sheet was surface-waxed to obtain about 4 to 6 pounds of surface wax composition per ream of 3,000 sq. ft. The base sheet on which the compositions of Table III were coated consisted of a metallic foil, glue laminated to a bleached sulfate-sulfite paper having a basis weight of 30 pounds per ream. Seals in this case were face-to-back, so that the paper was sealed in contact with the foil. Seal strength in all cases was measured on a Socony-Vacuum Oil Company seal tester, which determines in grams per inch of width of the sheet tested the yield force at a specified temperature (either 0° F. or 73° F.) of two sheets sealed together. The "fast" seal value means that the test pieces were adhered by laminating the two sheets by wrapping them around a roll, steam-heated to 210° F. at a speed of 50 feet a minute and under a tension of about 2 pounds per inch, and then passing the sample at the same speed through a water bath at about 60° F. The "slow" seal value means that the coated pieces were cooled in a stream of air at room temperature while traveling at a speed of 10 feet per minute. These seal values bracket the values for seal strength obtainable under commercial conditions, such as in wrapping machines. The "aged" seal means that the slow-cooled test samples were stored for 48 hours at 115–120° F., after which the seal strength was determined.

*Table III*

| Wax Composition | Percent | Seal Strength in gm./in. at 73° F. | |
| --- | --- | --- | --- |
| | | Slow | Aged |
| Intermediate Wax No. 1, M.P. 161.1° F. | 50 | 257 | 256 |
| Polyethylene B | 20 | | |
| Microcrystalline Wax, M.P. 145–47° F. | 30 | | |
| Fully Refined Paraffin, M.P. 135–37° F. | 50 | 166 | 125 |
| Polyethylene B | 20 | | |
| Microcrystalline Wax, M.P. 145–47° F. | 30 | | |

The particular microcrystalline wax used in the above compositions is sold by the Quaker State Refining Corporation under the trade name 145/47 Amber Micro Wax. Other representative microcrystalline waxes melting from 140° F. to 170° F. may be substituted with similar results.

The seal strengths listed in Table III, above, clearly indicate the superiority of the blend containing both polyethylene B and intermediate wax No. 1 over the comparable blend in which fully refined paraffin wax was substituted for the intermediate wax, both in initial slow seal strength and in retention of seal strength after aging.

Similar results may be obtained by substituting polyethylene A, polyethylene C or polyethylene D as described in Table I in place of polyethylene B in the above compositions. In each case, the blend containing both the satisfactory polyethylene and the intermediate wax will be found to exhibit seal strengths markedly superior to those resulting from a composition of the same polyethylene with a paraffin wax.

To be suitable for blending with intermediate waxes to give compositions of superior seal strength the polyethylene should have a molecular weight between 3,000 and 12,000, a solid density between 0.880 and 0.910 and at least 7% of its carbon atoms present in the form of short branches attached to the main carbon to carbon polymeric chain. Polyethylenes A, B, C and D are representative of the desired polyethylene material.

By direct contrast, polyethylenes E, F, G and H, which do not possess the necessary properties for satisfactory inclusion in the compositions of our invention, give relatively low seal strengths when substituted for the preferred polyethylene B in the intermediate wax-containing composition given above in Table III. In the following Table IV are tabulated seal strengths of compositions containing, by weight:

50% intermediate wax No. 1, M.P. 161.1° F.
30% microcrystalline wax, M.P. 145–47° F.
20% polyethylene, as indicated in Table IV

*Table IV*

| Polyethylene in Wax Blend | | | Percent Carbon in Branched Chains | Seal Strength in gm./in. at 73° F. | |
|---|---|---|---|---|---|
| Designation | M.W. | Density | | Slow | Aged |
| B | 4,000 | 0.890 | 8.7 | 257 | 256 |
| E | 2,000 | 0.920 | <1.0 | 190 | 117 |
| F | 5,000 | 0.920 | <1.0 | 145 | 146 |
| G | 7,000 | 0.900 | 5.3 | 37 | 33 |
| H | 12,000 | 0.910 | 3.2 | 37 | 39 |

The data of Table IV constitute a further indication that both an intermediate wax and a highly branched, low density polyethylene of relatively low molecular weight are critical components of our invention, since polyethylenes E, F, G and H are obviously inferior to polyethylene B in blends with the intermediate wax.

Our compositions also exhibit unusually high seal strengths at 0° F. A strong seal at low temperature is essential if the coated sheet is to be used in the packaging of frozen foods which are normally stored at or near 0° F. Seal strength data at 0° F. are presented in Table V for a coating composition containing the components critical to our invention as well as for similar compositions in which paraffin wax is substituted for the intermediate wax and a polyethylene lacking the proper degree of chain branching is substituted for the highly branched polyethylene necessary for the success of our invention. The base sheet used in these tests was a 30 pound per ream sulfate-sulfite paper.

*Table V*

| Wax Composition, percent | | | | | Seal Strength in gm./in. at 0° F. | |
|---|---|---|---|---|---|---|
| Intermediate Wax No. 1, M.P. 161.1° F. | Paraffin Wax, M.P. 135–37° F. | Microcrystalline Wax, M.P. 145–47° F. | Polyethylene | | Fast | Slow |
| | | | B | E | | |
| 50 | | 30 | 20 | | 175 | 252 |
| | 50 | 30 | 20 | | 211 | 76 |
| | 50 | 30 | | 20 | | 71 |

It is evident from the data of Table V and from data in later tables that our compositions exhibit an exceptionally high seal strength at low temperature as well as at ordinary room temperature. Particularly significant is the fact that the slow seal strengths attained by our blends compare favorably with the values for fast seals. Previously known blends which exhibited high values for fast seals were found to give very weak slow seals. This deficiency seriously limited the value of sheet materials coated with such blends when used on packaging machines not equipped with refrigerated units for rapidly setting the seal on the packaged commodities. This important and unique advantage of our compositions is shown in Table V and in the following Table VI, which also demonstrates the excellent adhesion of our compositions to a variety of base sheets. In Table VI, the fast and slow seal strengths of one of our compositions coated on each of three base sheets are tabulated, together with similar data for a comparable blend in which paraffin is substituted for the intermediate wax. The three base sheets were as follows: (1) A metallic foil, glue laminated to a 30 pound per ream bleached sulfate-sulfite paper; test seals were made adhering foil to paper; (2) A 30 pound per ream bleached sulfate-sulfite paper; and (3) A 26 pound per ream bleached sulfate paper coated while on the papermaking machine with a light (4 pound per ream) coating of a latex pigmented with titanium dioxide and calcium carbonate. Adequate adhesion of wax compositions to this latter sheet and to metallic foil are considered difficult to achieve.

*Table VI*

| Base Sheet | Wax Composition (Percent by Wt.) | | | | Seal Strength in gm./in. at 73° F. | |
|---|---|---|---|---|---|---|
| | 135/37 Paraffin Wax | Intermediate Wax #1 | 145/47 Micro Wax | Polyethylene B | Fast | Slow |
| #1. Foil-Paper | 50 | | 30 | 20 | | 166 |
| #1. Foil-Paper | | 50 | 30 | 20 | 184 | 257 |
| #2. 30 lb./rm. Paper | 50 | | 30 | 20 | 250 | 171 |
| #2. 30 lb./rm. Paper | | 50 | 30 | 20 | 260 | 257 |
| #3. Coated Paper | 50 | | 30 | 20 | 165 | 129 |
| #3. Coated Paper | | 50 | 30 | 20 | 247 | 280 |

The data in Table VI demonstrate the excellent adhesion and high values of slow seal strength of our composition on metallic foil and paper base sheets. Excellent adhesion to regenerated cellulose and various plastic films is also obtained by use of our compositions and paperboard cartons coated with our compositions exhibit excellent heat-sealing qualities.

A number of intermediate type waxes are available and satisfactory for use as the critical intermediate wax in our compositions. In Table VII are set forth seal strengths at 73° F. and 0° F. for a 30 pound per ream sulfate-sulfite paper coated with a composition consisting of:

20% polyethylene B
30% microcrystalline wax, M.P. 145–47° F.
50% intermediate wax as designated

*Table VII*

| Intermediate Wax in the Composition | Seal Strength in gm./inch at 73° F. | | Seal Strength in gm./inch at 0° F. | |
|---|---|---|---|---|
| | Fast | Slow | Fast | Slow |
| Intermediate Wax #1, M.P. 161.1° F. | 260 | 257 | 154 | 222 |
| Intermediate Wax #3, M.P. 143.6° F. | 271 | 251 | 160 | 175 |
| Intermediate Wax #5, M.P. 153° F. | 249 | 251 | 156 | 188 |
| Intermediate Wax #6, M.P. 152° F. | 249 | 242 | 155 | 196 |
| Intermediate Wax #7, M.P. 167.6° F. | 301 | 308 | 216 | 231 |

From the data in Table VII, it is apparent that any of a number of intermediate type waxes will perform satisfactorily in the composition of our invention. Results similar to those obtained in Tables III–VI have been obtained using any of the above listed waxes as the intermediate wax component of the blend. Other intermediate type waxes having comparable chemical composition and physical properties may also be used in our compositions.

The proportions of the several components of our compositions may be varied within certain limits. Between 5% and about 50% by weight of the branched polyethylene may be incorporated. Compositions containing about 20% of polyethylene having the properties of polyethylene B are preferred. Blends containing more than about 50% by weight of polyethylene exhibit relatively high melt viscosities and thus are less suitable for use with conventional waxing equipment. The incorporation of microcrystalline wax is not critical to our invention, but very satisfactory blends may be made including up to about 50% by weight of this type of wax. Blends containing about 30% by weight of microcrystalline wax are preferred. Higher amounts of microcrystalline wax cause an undesirable surface tackiness on the coated sheet. The intermediate wax concentration may be varied by weight from about 5% up to about 90%, about 50% being preferable.

In Table VIII are set forth the slow seal strengths at 73° F. and 0° F. of a series of our compositions coated on a 30 pound per ream sulfite-sulfate paper sheet. In this series, the percentages of the several components are varied within the limits previously set forth.

*Table VIII*

| Composition in Percent by Weight | | | | Slow Seal Strength in gm./inch | |
|---|---|---|---|---|---|
| Intermediate Wax #7 M.P. 167.6° F. | Microcrystalline Wax M.P. 145–47° F. | Polyethylene | | 73° F. | 0° F. |
| | | B | E | | |
| 90 | 0 | 10 | ------ | 228 | 195 |
| 80 | 0 | 20 | ------ | 241 | 233 |
| 65 | 15 | 20 | ------ | 243 | 188 |
| 65 | 30 | 5 | ------ | 335 | 104 |
| 50 | 30 | 20 | ------ | 308 | 231 |
| 35 | 30 | 35 | ------ | 272 | 293 |
| 20 | 45 | 35 | ------ | 280 | 282 |
| 20 | 30 | 50 | ------ | 230 | 303 |
| 50 | 30 | 10 | 10 | 256 | 186 |
| 50 | 30 | ------ | 20 | ------ | 71 |

It is evident from Table VIII that excellent slow seal strengths are obtained over a wide temperature range throughout the concentration ranges cited above. It will also be noted that when the composition contains at least 10% by weight of the preferred branched polyethylene, other less desirable components such as a polyethylene having a very low degree of branching may be added in small percentages without appreciably degrading the coating seal strength. The preferred polyethylene may not, however, be completely replaced by such substitutions. Similarly, if the composition contains at least 25% by weight of the critical intermediate wax, small percentages of paraffin wax may be included without appreciable deleterious effect on the properties of the blend.

In the compositions of Table VIII, as in all previously described compositions exemplifying our invention, similarly superior seal strengths will be obtained if polyethylene B is replaced by other polyethylenes having molecular weights between about 3,000 and 12,000, solid densities between 0.880 and 0.910 and between 7% and about 12% of their carbon atoms present as short chain branches, as exemplified by polyethylenes A, C and D of Table I.

Having now described in detail preferred forms of our invention, it is obvious that various modifications may be made without departing from the spirit thereof. We, therefore, do not wish to be limited in the scope of our invention except as defined in the appended claims.

We claim:

1. A wax composition containing as the essential components by weight from about 5% to about 50% of a polyethylene having a molecular weight between about 3,000 and about 12,000, a density between 0.880 and 0.910 and between about 7% and about 12% of its carbon atoms present as branched chain carbons, and between about 5% and about 90% of an intermediate wax derived from petroleum distillate and having a melting point between about 140° F. and 170° F., a viscosity of less than 10 centistokes when measured at 210° F. and a refractive index, when measured at 194° F., of at least 1.4292 plus 0.0002 refractive index units per degree Fahrenheit by which the melting point of said wax exceeds 140° F.

2. A wax composition which comprises by weight from about 5% to about 50% of a polyethylene having a molecular weight between about 3,000 and about 12,000, a solid density between 0.880 and 0.910 and having between 7% and 12% of the carbon atoms present as short chain branching, between about 5% and about 90% of an intermediate wax derived from petroleum distillate and having a melting point between about 140° F. and 170° F., a viscosity of less than 10 centistokes when measured at 210° F. and a refractive index, when measured at 194° F., of at least 1.4292 plus 0.0002 refractive index units per degree Fahrenheit by which the melting point of said wax exceeds 140° F., and not more than 50% of a microcrystalline petroleum wax having a melting point between about 140° and about 170° F.

3. A wax composition which consists essentially of about 20% by weight of a polyethylene having a number average molecular weight of about 4,000 and a solid density of about 0.890 and having about 8.7% of the carbon atoms in the molecule present as short chain branching, about 50% by weight of an intermediate wax derived from petroleum distillate and having a melting point between about 140° F. and 170° F., a viscosity of less than 10 centistokes when measured at 210° F. and a refractive index at 194° F., of at least 1.4292 plus 0.0002 refractive index units per degree Fahrenheit by which the melting point of said wax exceeds 140° F., and about 30% of microcrystalline wax having a melting point between 140° F. and 170° F.

4. A heat-sealable sheet material comprising a flexible base sheet bearing a superficial coating of a wax composition according to claim 1.

5. A heat-sealable sheet material comprising a flexible base sheet bearing a superficial coating of a wax composition according to claim 2.

6. A heat-sealable sheet material comprising a flexible base sheet bearing a superficial coating of a wax composition according to claim 3.

7. A heat-sealable sheet material comprising a paper base sheet bearing a superficial coating of a wax composition according to claim 1.

8. A heat-sealable sheet material comprising a paper base sheet bearing a superficial coating of a wax composition according to claim 2.

9. A heat-sealable sheet material comprising a paper base sheet bearing a superficial coating of a wax composition according to claim 3.

References Cited in the file of this patent

UNITED STATES PATENTS

| 2,728,735 | Anderson | Dec. 27, 1955 |
| 2,733,225 | Smith | Jan. 31, 1956 |
| 2,791,569 | Backlund | Mar. 7, 1957 |
| 2,808,382 | Jakaitis | Oct. 1, 1957 |

OTHER REFERENCES

Warth: "The Chemistry and Technology of Waxes," Reinhold Publishing Corp., New York (2nd edition) (1956), pages 416, 506 and 508.